United States Patent [19]
Nickerson

[11] Patent Number: 6,041,266
[45] Date of Patent: Mar. 21, 2000

[54] BASEBALL SCOREKEEPER

[76] Inventor: Danny L. Nickerson, 17636 Teklanika Dr., Eagle River, Ak. 99577

[21] Appl. No.: 07/820,261

[22] Filed: Jan. 14, 1992

[51] Int. Cl.[7] .................................................. G06F 15/28
[52] U.S. Cl. ................................ 700/92; 273/451; 463/3; 700/91
[58] Field of Search .................................. 364/411, 410, 364/412, 709.01; 340/323 R; 273/25, 26, 27, 28, 433, 88, 148 R, 451; 700/91, 92; 463/3, 25

[56] References Cited

U.S. PATENT DOCUMENTS

| | | | |
|---|---|---|---|
| 4,237,372 | 12/1980 | Zevgolis | 377/5 |
| 4,266,214 | 5/1981 | Peters, Jr. | 340/323 R |
| 4,324,402 | 4/1982 | Klose | 273/88 |
| 4,367,526 | 1/1983 | Mc Geary | 377/5 |
| 4,372,557 | 2/1983 | Del Principe et al. | 273/88 |
| 4,868,772 | 9/1989 | Collard | 364/709.01 |
| 5,026,058 | 6/1991 | Bromley | 273/93 C |
| 5,153,826 | 10/1992 | Johnson | 364/410 |

*Primary Examiner*—Frantzy Poinvil
*Attorney, Agent, or Firm*—William D. Hall

[57] ABSTRACT

An electronic automated scorekeeper for calculation and recordation of athletic contest statistics. An operator enters data into the device via a keyboard with a plurality of specialized keys. One set of the keys located on a graphic of the playing field, corresponds to the positions of the players in the contest, such as the field positions of baseball players. Another set of the keys is dedicated to one step entry of common events during the contest. Other keys provide control functions and alpha-numeric entry. At the start of the contest, the operator enters data about the players and the teams. As the contest is contested, the operator enters events as they occur. The automated scorekeeper records the data entered and calculates the progress of the game and the player statistics as they occur. The device provides for a printed output of the game in progress, for periodic statistical summaries and for a final game and player statistical output.

18 Claims, 8 Drawing Sheets

FINAL STATS

FINAL SCORE AFTER _____ INNINGS

OFFICIAL TIME _____ DATE _____

VISITORS: _____ RUNS _____ HITS _____ ERRORS _____

HOME: _____ RUNS _____ HITS _____ ERRORS _____

FIGURE 5

BASEBALL SCOREKEEPER

BACKGROUND OF THE INVENTION

The present invention relates to electronic recording and calculating devices. More specifically, the present invention relates to electronic devices for recording, manipulation and storage of statistical sports data.

Sporting contests require accurate recordation of the events that transpire during the contest. A significant statistical record is often generated in a single athletic contest. Accurate record keeping often requires an experienced skilled individual and a significant effort during the contest. The final outcome of the contest is determined by record keeping or scoring and an evaluation of the contestants performance is accomplished through analysis of the statistical record. Historically a scorekeeper who has considerable knowledge of the contest is utilized to perform the necessary recordation and statistical compilations.

Devices which aid the scorekeeper have also been developed for recording the score of an athletic contest. U.S. Pat. No. 4,266,214 teaches a portable game scoring apparatus which allows for input of scoring information and provides displays of accumulated scoring information for several different games.

McGeary U.S. Pat. No. 4,367,526 teaches a golf calculator which automatically computes scoring results for a golf game based upon information entered during the course of play.

Collard U.S. Pat. No. 4,868,772 teaches a device which computes several aspects of a baseball player's individual performance but does not score a game.

SUMMARY OF THE INVENTION

The present invention is utilized to perform statistical record keeping during a baseball or softball game, much in the same manner as a traditional scorekeeper. Because of the automatic recordation and calculations preformed by the device, the operator need only enter basic information to keep accurate statistics. In this manner the device of the present invention allows a less knowledgeable individual to keep score and maintain statistics to a high degree of accuracy.

It is an object of the present invention to maintain the score and statistics of a baseball game while the game is in progress.

It is another object of the invention to provide a device which tallies, records and computes the statistics of a baseball game, play-by-play, during the game.

It is a further object of the present invention to provide a baseball scorekeeping device which allows for the entry of data in a simple manner allowing record keeping and statistical recording by an operator having less than complete knowledge of the sport.

It is a further object of the present invention to provide a device which maintains a printed record of all aspects of the statistical scorekeeping during the baseball game.

It is a object of the present invention to provide a device which records and stores all pitches by both teams in a baseball game.

It is an object of the present invention to compute batting averages on an ongoing basis during a baseball game and to report the averages when desired.

It is another object of the present invention to track the elapsed game time of a baseball game.

The automated scorekeeper taught in the exemplary embodiment described herein satisfies these and other objects by providing a recordkeeping device which accepts data via a user friendly keyboard, records the data and calculates baseball statistics. The device has a display screen for providing the operator with timely information such as inning, score, count on batter and team rosters. The device also has a date output port for a printer for hard copy output of the game statistics or for downloading of statistical information.

The design of the present invention includes a keyboard with a baseball diamond graphic to allow for easier data entry. Further, the keyboard includes a large number of specialized keys for entry of common statistical events. The device also incudes stored user help information which can be easily accessed to assist the user in the entry of less common statistical events.

BRIEF DESCRIPTION OF THE DRAWINGS

For a better understanding of the nature of the present invention, reference is had to the following figures and detailed description, wherein like elements are accorded like reference numerals, and wherein:

FIG. 5 is view of a fourth exemplary screen of the present invention.

DETAILED DESCRIPTION OF PREFERRED EXEMPLARY EMBODIMENTS

Figure 1:
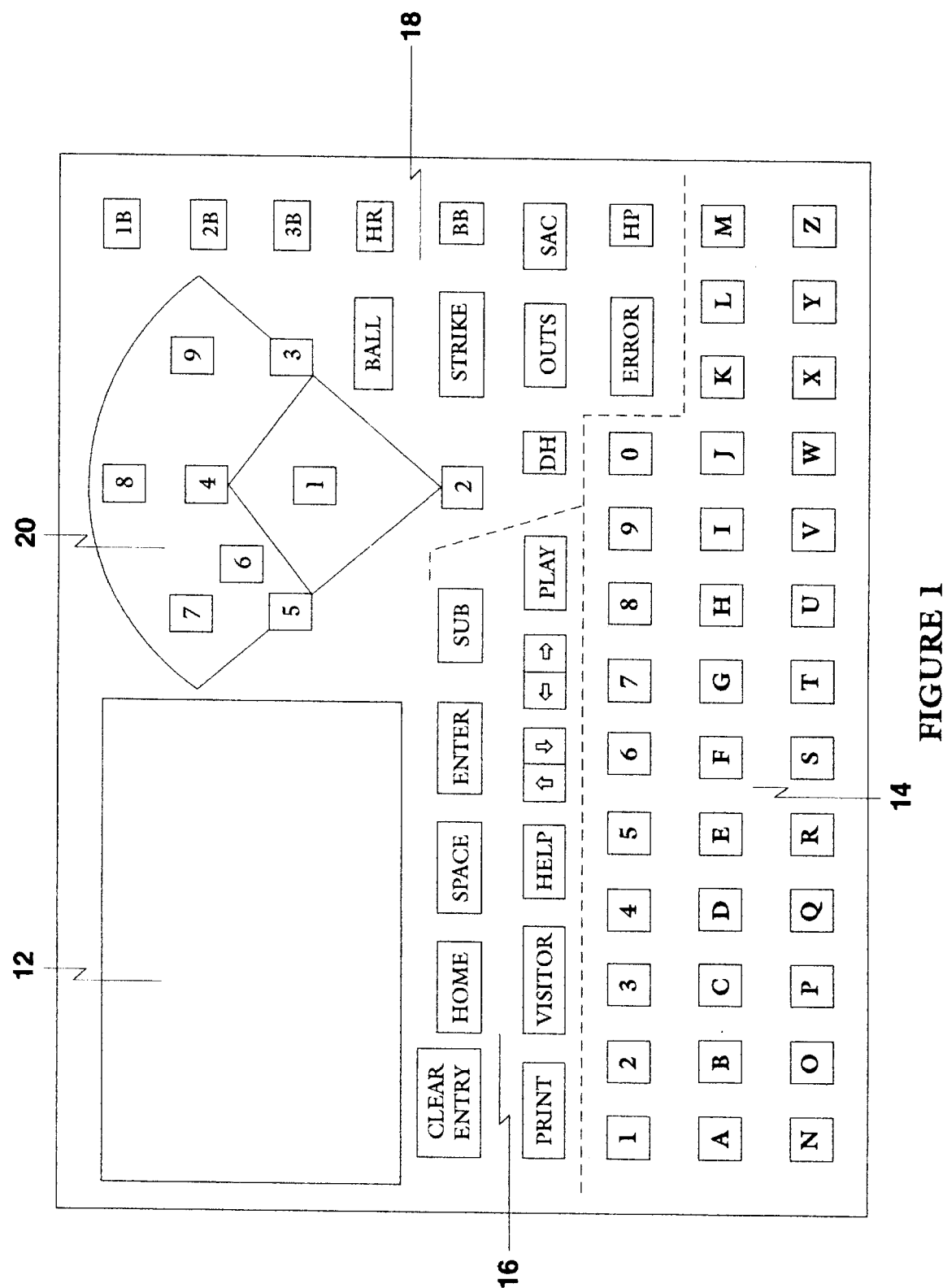
FIG. 1 is a top planer view of the present invention with a blank display screen.

The device, as illustrated in FIG. 1, includes a display 12 for display of a number of sets of information each accessible by either a single key or a short series of key strokes to allow ready access to available data before, during and after a game. The screen displays team rosters FIG. 2, a help screen FIG. 3, a game-in-progress screen FIG. 4, and a final score screen FIG. 5.

The team roster records each players number, name and field position for both home and visitor teams. The home team and/or visitor team roster screens can be accessed at any time during the game by actuation of the HOME or VISITOR key respectively. The roster can be accessed for reference or to allow for the entry of substitute players in the team roster either during the initial roster entry or during the game as substitutions arise.

Figure 2:
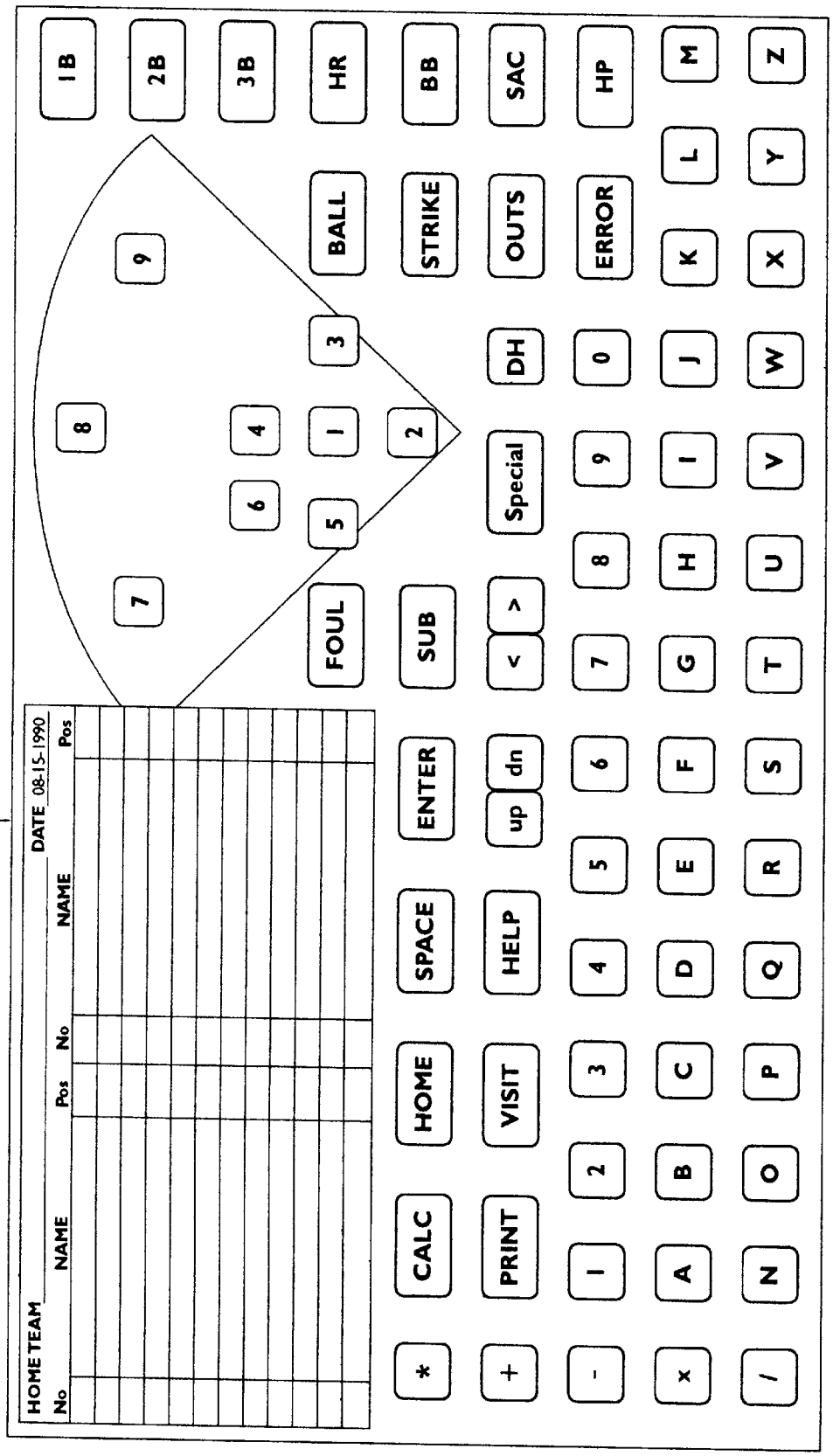
FIG. 2 is a top planer view of the present invention illustrating a first exemplary screen of the present invention.

When the computer is first activated, the processor 60 is initialized. The scorekeeper is now in the player entry mode, and the home team entry screen, FIG. 2, is displayed on the display 12. The operator is thus prompted to enter the numbers, names and positions of the home team. The names, numbers and positions are entered by typing on the full alpha-numeric keyboard. Player names can be abbreviated and positions are entered using their common two letter designations.

Chart I provides an example of a team roster entry for an exemplary home team.

CHART I

| | HOME TEAM Pepsi | Date |
|---|---|---|
| No. | Name | Position |
| 11 | Smith | 2B |
| 22 | Coves | RF |
| 13 | Peterson | LF |
| 24 | Waterfield | SS |
| 17 | Taylor | 1B |
| 12 | Moore | 3B |
| 9 | Owens | C |
| 7 | Hillard | CF |
| 30 | Jordan | P |

The visitors team is entered in a similar manner after entry of the home team is completed.

Substitutions are made by recall of the appropriate team roster. The cursor keys are utilized to scroll up, down, left or right to the desired position. To enter a substitution, the SUB key is actuated and a space is created below the listed player. The scorekeeper is now in the substitute player entry mode. The substitution player number, name and position is then entered. The Home or Visitor key is then again actuated to return to the game mode and display.

The key board, as illustrated in FIG. 1, includes a set of alpha-numeric keys 14, a set of control keys 16, a set of common statistical event keys 18, and a set of field position keys 20 positioned around a baseball diamond graphic. The provision of these sets of keys allows for the easy and rapid entry of all common statistical events during the game without undue complexity or knowledge of the statistic keeping procedures for baseball.

The field position keys 20 can include the nine defensive player position for baseball or the ten defensive position for softball. The field position keys 20 are utilized to enter a player position when necessary, when the player is being listed on the team roster, when he makes a play, he is at bat or when it is otherwise necessary to designate a player position or to identify a field position. The provision of these keys allows the operator to easily and rapidly input play action by selecting the field position from the graphic keys, without the need for entry of position abbreviations from alpha-numeric keys. Errors are also reduced through the use of single key entry.

The event keys 18 are utilized for quick entry of common events such as a single -1B, a triple -3B, base on balls -BB, sacrifice -SAC, hit by pitch -HP, a strike, an out, etc. The DH key is for indicating a designated hitter, alternatively an EH key can be provided for an extra hitter in softball. The optional foul ball key, illustrated in FIG. 2 is utilized to maintain an accurate record of the total number of pitches. Without the foul ball key, the first two fouls are manually entered as strikes. With the foul ball key, all fouls are entered as such, and the processor 60 automatically records the first two as strikes.

The alpha-numeric keys 14 are for entry of alpha-numeric data such as player number, names, or unusual events.

The control keys 16 are for controlling the functions of the device, such as changing displays, printing or accessing help. In broader terms, each of the above keys is a manually operable element.

Figure 3:
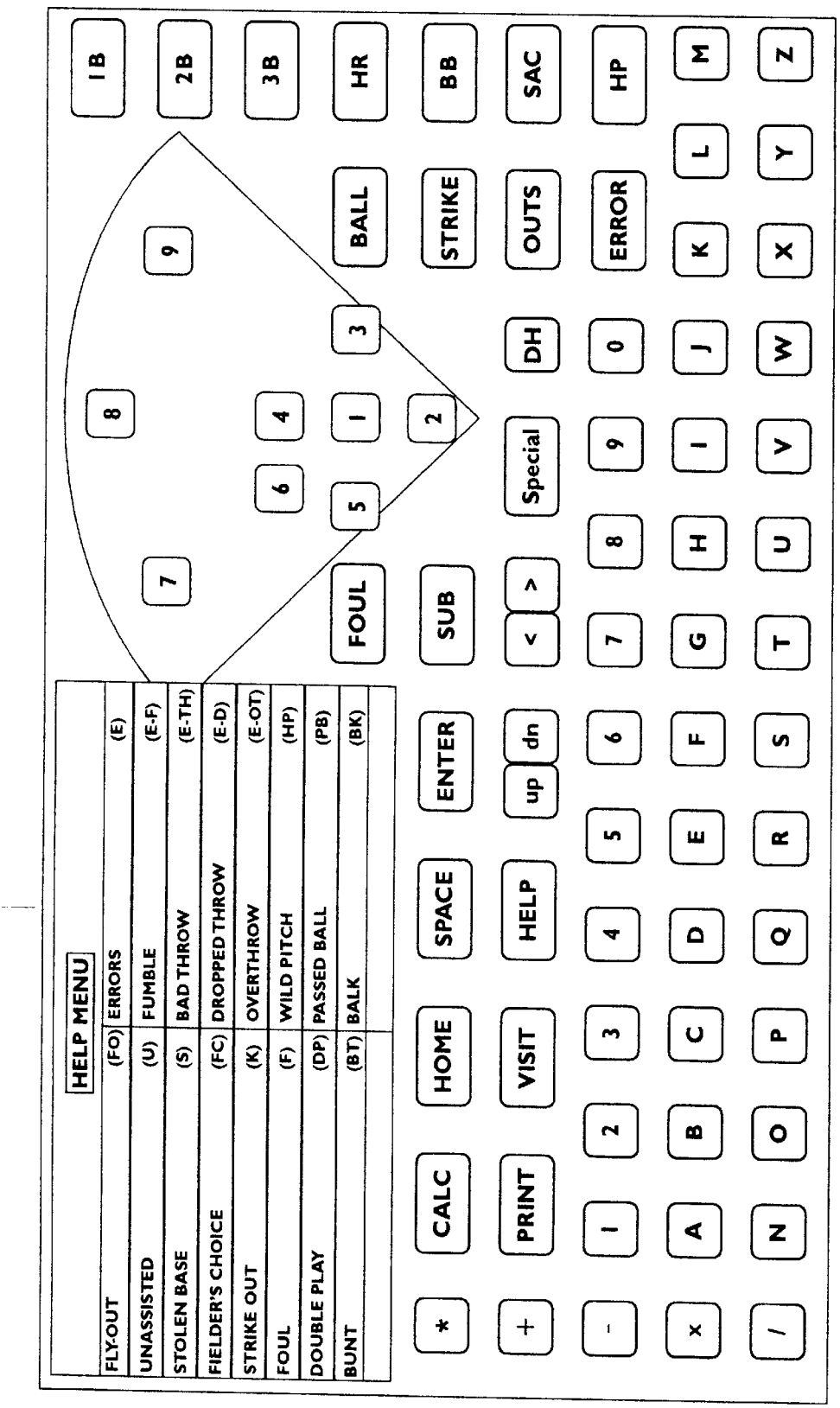
FIG. 3 is a top planer view of the present invention illustrating a second exemplary screen of the present invention.

FIG. 3 illustrates the help screen which provides the user with entry codes not found on the predesignated keys. These events cannot be entered by a single event key from key group 18. Instead, when necessary to record such events, the operator will select the "special" or "play" key and then enter the code found in the help screen, such as "F" "O" for a fly out.

Figure 4:
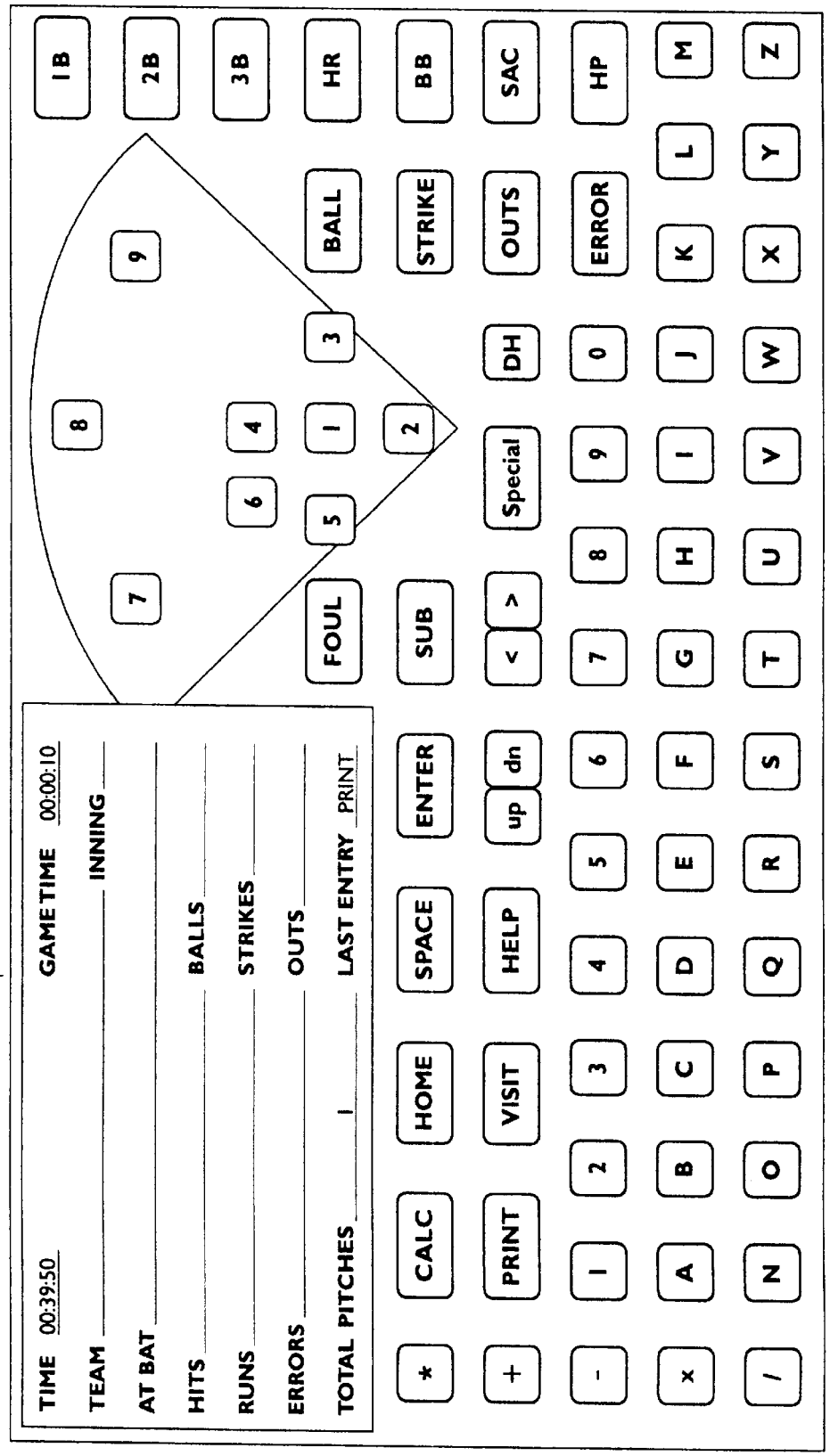
FIG. 4 is a top planer view of the present invention illustrating a third exemplary screen of the present invention.

As illustrated in FIG. 4, during the game, the game-in-progress screen is displayed on the display 12. The following elements are displayed:

Time—actual time of day,

Game Time—the total elapsed game time beginning from the first pitch,

Team—the team currently at bat,

Inning—displays the current inning,

At Bat—indicates the player at bat,

Hits—displays the total number of hits for the team at bat,

Runs—displays the total number of runs for the team at bat,

Errors—displays total errors for the team at bat,

Total Pitches—displays the total number of pitches thrown by both teams during the game, Balls—displays the current ball count for the current batter, Strikes—displays the current strike count for the current batter, Outs—displays the number of outs on the team at bat for the current inning, and Last Entry—displays the last entry or command entered by the operator.

Once the first pitch is thrown, the user enters it as a ball, strike, or hit by actuation of the appropriate key from the event key set 18. The game time counter is automatically started upon entry of the first event. Each event is then entered as it occurs. As each batter's at bat is concluded, through entry of an out, bases earned, etc., the game-in-progress display is automatically advanced to the next batter in the lineup.

The statistics, runs/hits/errors/players left on/score, are calculated and recorded at the end of each half inning. The display is advanced to the opposing team after three outs at the end of each half inning. The current elapsed time is recorded at the start of each inning.

The statistics associated with each batter's turn at bat are recorded for later output and/or are printed as the line up advances if a printer is currently attached to the device.

The following example of the record of an exemplary inning of a baseball game illustrates an inning where six visitor players were at bat with a strike out, a single, a hit by pitch, a fly out to center field, a base on balls and a fly out to center field for the visiting team and five players at bat for the home team with one hit by pitch, a fly out to center field, a home run, a strike out and an unassisted out by the first baseman:

| Visitor | | 0:00 |
|---|---|---|
| 4   Lansford | 3B | |
| SBSBB K | | 1OUT |
| 42   Henderson | CF | |
| S 1B | | |
| 33   Canseco | RF | |
| S HP | | |
| 39   Parker | LF | |
| SSBB F08 | | 2OUT |
| 25   McGwire | 1B | |

-continued

| | | |
|---|---|---|
| SBBSB BB | | |
| 36 Steinbach | C | |
| BB F08 | 3OUT | |
| .5 OR 1H 0E | 3LO | |
| HOME 0 Visitor 0 | | |
| Home | | 0:25 |
| 3 Sax | 2B | |
| HP | | |
| 22 Stubbs | 1B | |
| SSB F08 | 1OUT | |
| 9 Hatcher | LF | |
| SS BK HR | | |
| 5 Marshall | RF | |
| SSB K | 2OUT | |
| 31 Shelby | CF | |
| B U3 | 3OUT | |
| 1.0 2R 1H 0E | 0LO | |

Other exemplary events are recorded as follows:

| | | |
|---|---|---|
| 25 McGwire | 1B | |
| SSB 6-4 | 3OUT | |

Number 25, McGwire the first baseman takes two strikes and a ball, then hits to the shortstop who throws to second for the out.

| | | |
|---|---|---|
| 49 Belcher | P | |
| (SUB) | | |
| 56 Heep | PH | |
| BS 6-3 | 3OUT | |

Belcher is replaced by a substitute, number 56 Heep, a pinch hitter who is thrown out at first by the shortstop.

| | | |
|---|---|---|
| 32 Woodson | PH | |
| S 6-4FC | 1OUT | |

Woodson hits to the shortstop who throws to second for a forced out, fielder's choice.

| | | |
|---|---|---|
| 22 Stubbs | 1B | |
| BS | | |
| *WP 32 To 2B | | |
| 3U | 3OUT | |

While Stubbs is at bat, a wild patch allowed number 32 to advance to second base.

| | | |
|---|---|---|
| 30 Hamilton | 3B | |
| BSS 5U 5-3 DP | 3OUT | |

Hamilton hits to the third baseman who makes an unassisted out at third and then throws to the first baseman for a double play.

| | | |
|---|---|---|
| 22 Stubbs | 1B | |
| SB | | |
| *3 Steal | | |
| F09 | 3OUT | |

While Stubbs is at bat, number 3 steals second base.

The above examples illustrate how the simple straight forward shorthand recording of the present invention allows for accurate fast statistical scoring of a game in progress. If necessary, the alpha-numeric keys can be utilized by the operator to insert annotations into the record at any time to explain and/or record unusual events.

Figure 6:
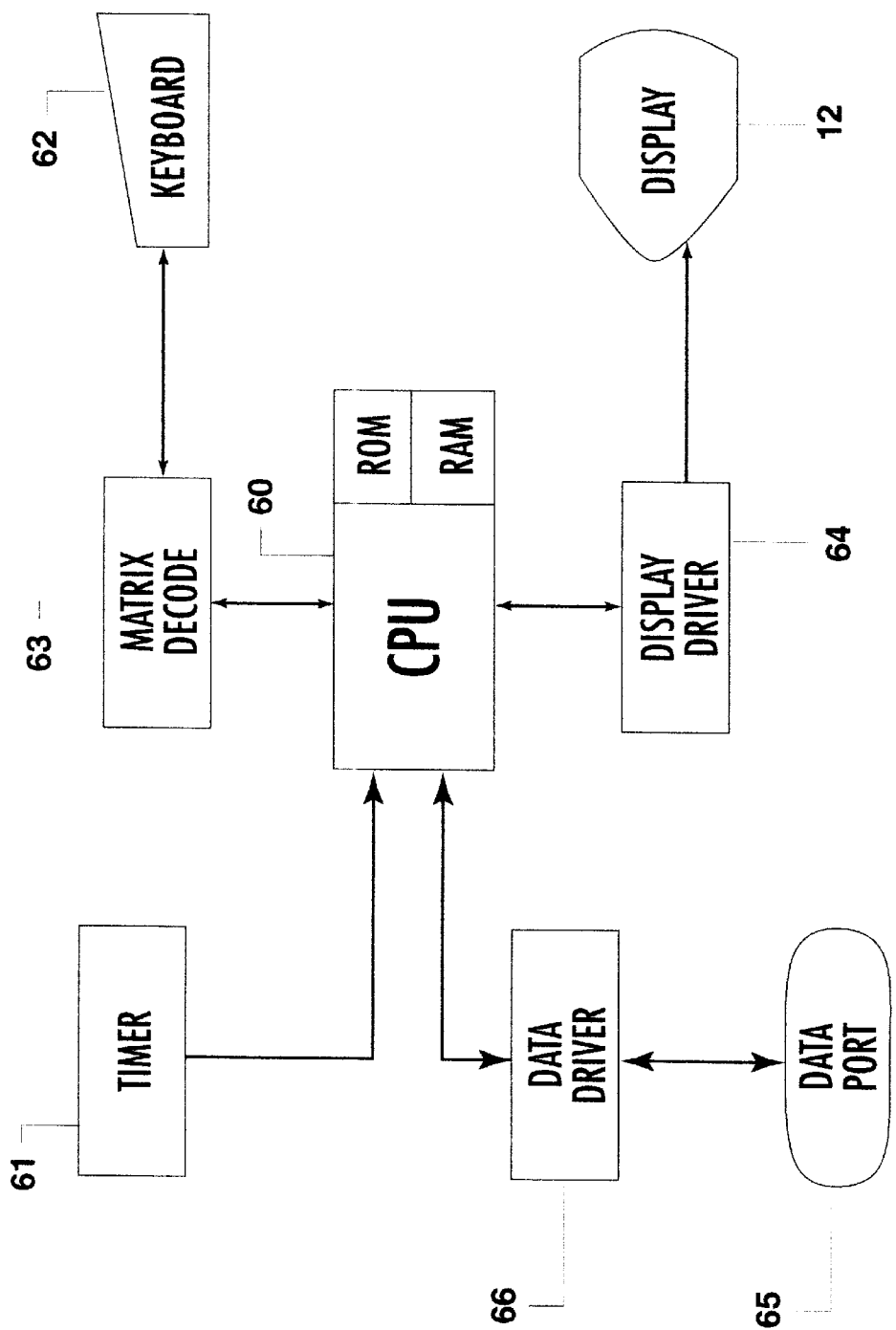
FIG. 6 is a block diagram of an exemplary embodiment of the circuitry of the present invention.

FIG. 6 provides a block diagram of an exemplary embodiment for implementation of the statistical logic of the present invention.

In the illustrated exemplary embodiment, a CPU 60 is utilized to perform the necessary calculations and record keeping. CPU 60 can, for example, include ROM for program storage and RAM for storage of team data, player data and game statistics. A register within CPU 60 holds the team data which is displayed and automatically rotated at the end of an inning. Also, players are rotated when an at bat ends. The device is provided with a timer 61 for tracking game time and real time. Alternatively, the device could utilize a CPU with onboard timing capabilities. The elapsed game time and real time are stored in registers for display and updating during the game.

A keyboard 62 and decoder 63 are provided for user input to CPU 60. The device also includes a display driver 64 and a display 12 for display to the user. The provision of data port 65 and data driver 66, allows the device to export data to a printer or other device. The data can be output during a game to a printer to provide a hard copy of the game in progress or saved for downloading after the game, for subsequent printing, manipulation or statistical compilation.

The components illustrated in functional block form in FIG. 6 are exemplary. The components may be discreet or they may be incorporated into a single chip. Obvious substitute component combinations with similar functionality can be substituted without departure from the scope of the present invention.

Figure 7A:
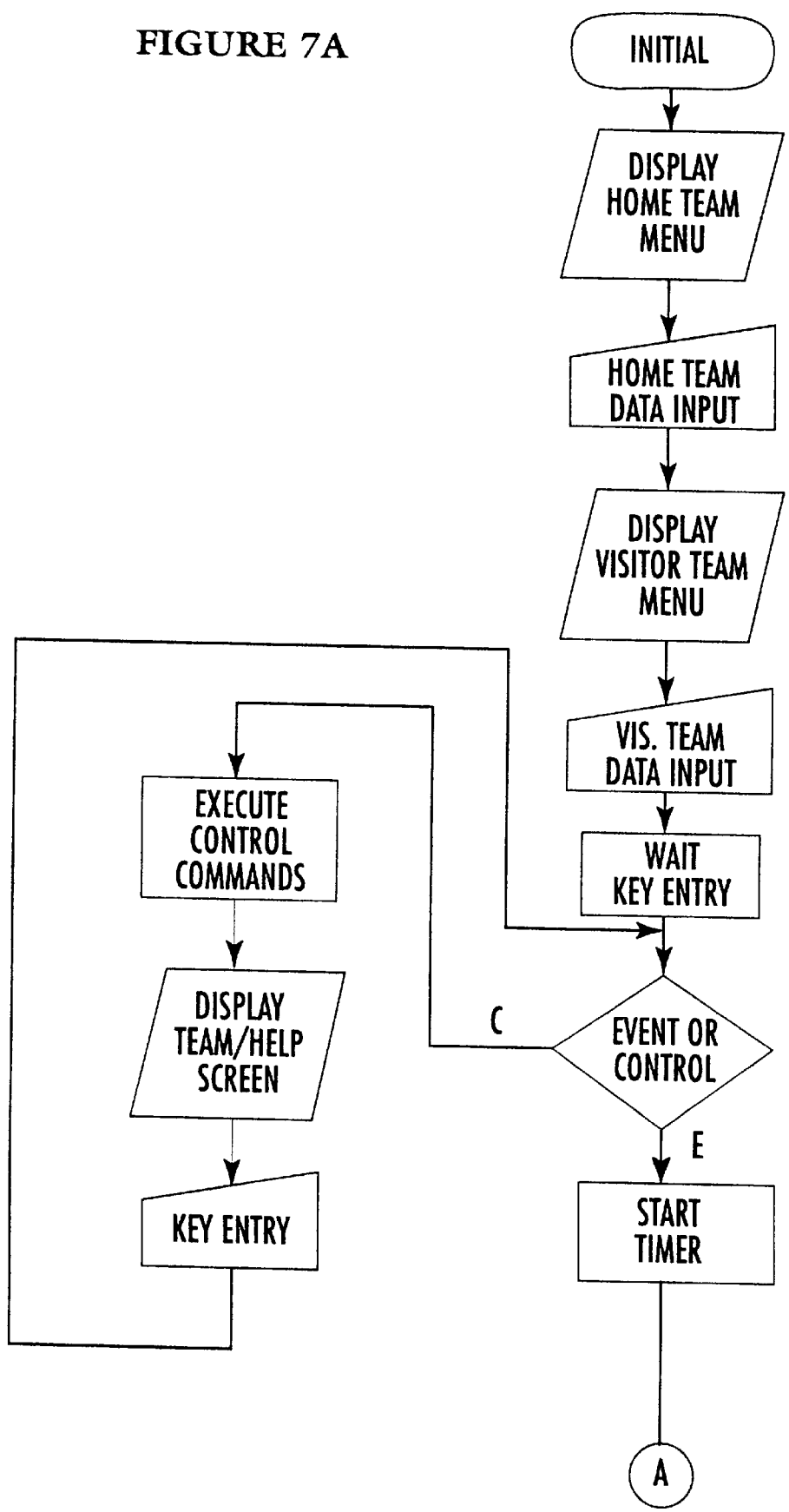
FIGS. 7A and 7B are a flow diagram illustrating exemplary logic of the present invention.
Figure 7B:
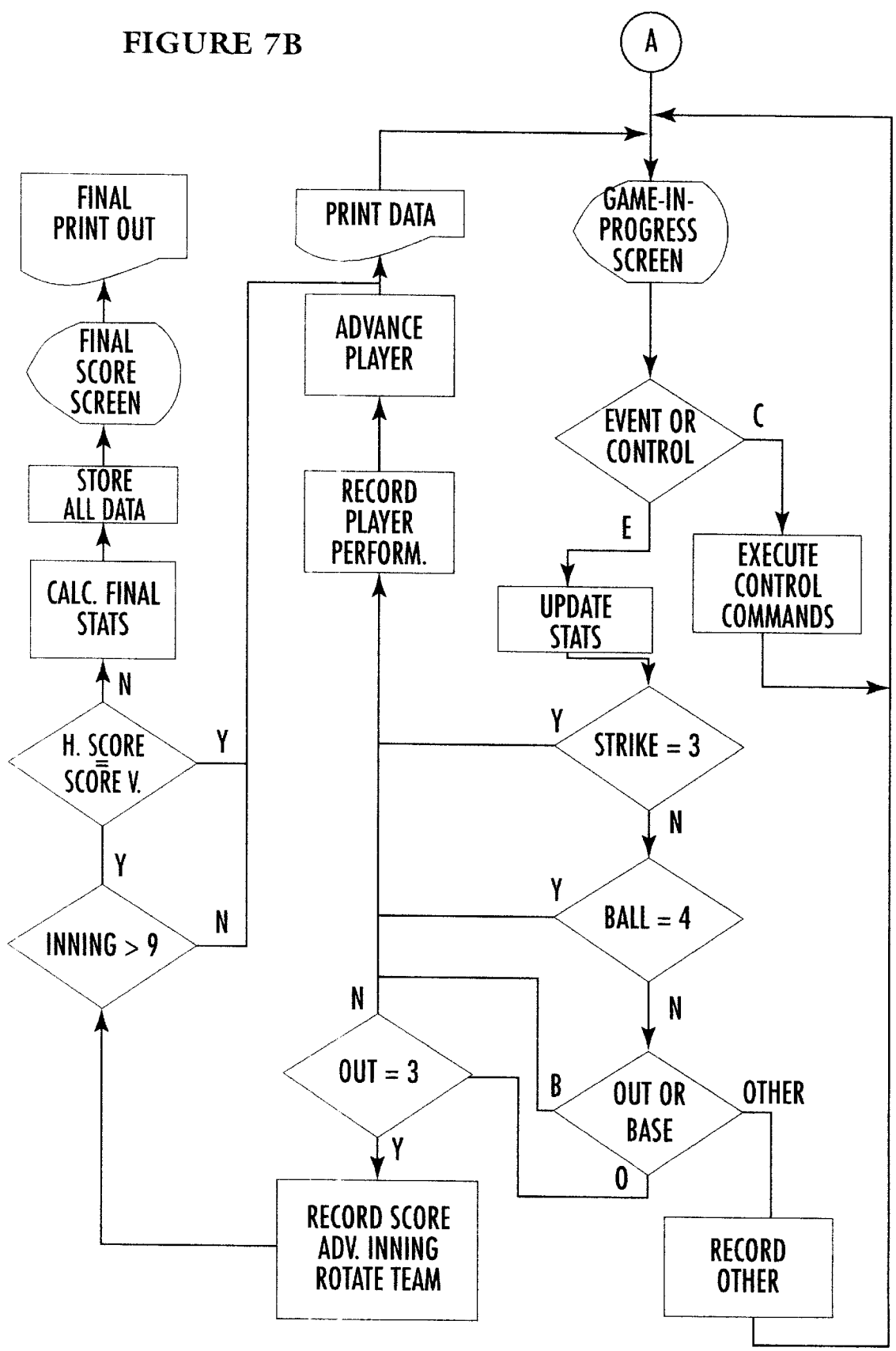

FIGS. 7A and B illustrate an exemplary logic flow pattern for the device of the present invention. The steps illustrated in these Figures can be implemented by a processor such as CPU 60 illustrated in FIG. 6.

As illustrated in FIG. 7A, upon start up of the device, the processor is initialized. Next the Home team menu is displayed and then the operator can enter the home team data. After completion of the home team data entry, the Visitor team menu is displayed and the Visitor team data entered.

The processor then enters a wait state to await the next key entry by the operator. If the next key is a control key, the control command is processed and the processor accepts additional key entries, such as alpha-numeric keys, necessary to complete the command process. When an event or control key is entered, the processor again evaluates the key entry and either executes the command or proceeds to the start timer step.

Upon entry of the first event key after initialization, the game time is started to track the total elapsed time of the game. The timer continues to run until the end of the game, when all data is tabulated and stored. Once the timer has been started, the game-in-progress screen is displayed.

While this screen is displayed, the operator can enter events, control commands, or alpha-numeric data.

Most entries will be events which are recorded as described below. However, it is occasionally necessary to enter a command key such as HOME, to update the Home team or to provide for a substitute. Upon entry of the command key, the command is executed and the appropriate additional keys are accepted. Upon completion, the processor returns to the display of the game-in-progress screen.

As each event is entered, the game statistics are updated, eg. the ball or strike count of the present batter is increased or a base or run is recorded. Next the processor compares the strike and ball counts to determine if the current batter is out or walked. If so the player performance is recorded and the player rotation is advanced. Otherwise the event key is analyzed to determine if the event is an out, a hit or an other event. If another event, the processor records the event and returns to the game-in-progress screen. If a hit then the player performance is recorded and the player rotation advanced.

If the event is an out, then the processor compares the number of outs and if less than three for the current half inning, the player performance is recorded and the player rotation advanced. After advance of the player rotation, the statistics of the latest player can be printed if desired to provide a running hard copy during the game.

If the outs equals three, then the score for the half inning is recorded, the player performance is recorded and the inning is advanced and the teams are rotated.

The processor then determines if the game is completed by first checking the inning number, and if greater than nine, determining if the score is tied. If the inning is not greater than nine or the score is not tied when the inning is greater than nine, the processor returns to the game-in-progress screen. The device will allow for play of as many innings as necessary to complete the game as long as the score remains tied after the completion of the ninth inning. Otherwise the game is complete and the final statistics are calculated and stored. The final score screen, FIG. 5, is displayed and the final statistics are either printed and/or stored for later output.

Final statistical calculations can include games won calculated as a percentage of total games played; player batting averages calculated by dividing the total number of hits by the total number of times at bat; fielding averages determined by dividing the total number of put-outs and assists by the total number of putouts, assists and errors.

Appendix A is an exemplary program for executing the logic of the present invention.

APPENDIX A

PROGRAM CODE

Danny L. Nickerson

AUTOMATED SCOREKEEPER

```
DIM MainMenu$(14,2), HelpMenu$(14,2), HomeMenu$(14,2), VistMenu$(14,2)
DIM Arry%(30000)
DIM PlayerNumber$(25,2)
DIM PlayerName$(25,2)
DIM PlayerPosition$(25,2)

MainMenu$(1,1)="  TIME 00:00:00         GAME TIME 00:00:00    "
MainMenu$(2,1)="                                               "
MainMenu$(3,1)="  TEAM                          INNING         "
MainMenu$(4,1)="                                               "
MainMenu$(5,1)="  AT BAT                                       "
MainMenu$(6,1)="                                               "
MainMenu$(7,1)="  HITS            BALLS                        "
MainMenu$(8,1)="                                               "
MainMenu$(9,1)="  RUNS            STRIKES                      "
MainMenu$(10,1)="                                              "
MainMenu$(11,1)=" ERRORS           OUTS                        "
MainMenu$(12,1)="                                              "
MainMenu$(13,1)=" TOTAL PITCHES    LAST ENTRY                  "
MainMenu$(14,1)="                                              "

MainMenu$(1,2)="+++++++++++++++++++++++++++++++++++++++++++++++"
MainMenu$(2,2)="+++++++++++++++++++++++++++++++++++++++++++++++"
MainMenu$(3,2)="+++++++++++++++++++++++++++++++++++++++++++++++"
MainMenu$(4,2)="+++++++++++++++++++++++++++++++++++++++++++++++"
MainMenu$(5,2)="+++++++++++++++++++++++++++++++++++++++++++++++"
MainMenu$(6,2)="+++++++++++++++++++++++++++++++++++++++++++++++"
MainMenu$(7,2)="+++++++++++++++++++++++++++++++++++++++++++++++"
MainMenu$(8,2)="+++++++++++++++++++++++++++++++++++++++++++++++"
MainMenu$(9,2)="+++++++++++++++++++++++++++++++++++++++++++++++"
MainMenu$(10,2)="+++++++++++++++++++++++++++++++++++++++++++++++"
MainMenu$(11,2)="+++++++++++++++++++++++++++++++++++++++++++++++"
MainMenu$(12,2)="+++++++++++++++++++++++++++++++++++++++++++++++"
MainMenu$(13,2)="+++++++++++++++++++++++++++++++++++++++++++++++"
MainMenu$(14,2)="+++++++++++++++++++++++++++++++++++++++++++++++"

HelpMenu$(1,1)="                                               "
HelpMenu$(2,1)="              HELP MENU                        "
HelpMenu$(3,1)="                                               "
HelpMenu$(4,1)="                                               "
HelpMenu$(5,1)="FLY-OUT          (FO) ERRORS          (E)      "
HelpMenu$(6,1)="UNASSISTED       (U)  FUMBLE          (E_F)    "
HelpMenu$(7,1)="STOLEN BASE      (S)  BAD THROW       (E_TH)   "
HelpMenu$(8,1)="FIELDER'S CHOICE (FC) DROPPED THROW   (E_D)    "
HelpMenu$(9,1)="STRIKE OUT       (K)  OVERTHROW       (E_OT)   "
HelpMenu$(10,1)="FOUL            (F)  WILD PITCH      (WP)     "
HelpMenu$(11,1)="DOUBLE PLAY     (DP) PASSED BALL     (PB)     "
HelpMenu$(12,1)="BUNT            (BT) BALK            (BK)     "
HelpMenu$(13,1)="                                              "
HelpMenu$(14,1)="                                              "

HelpMenu$(1,2)="+++++++++++++++++++++++++++++++++++++++++++++++"
HelpMenu$(2,2)="+++++++++++++++++++++++++++++++++++++++++++++++"
HelpMenu$(3,2)="+++++++++++++++++++++++++++++++++++++++++++++++"
HelpMenu$(4,2)="+++++++++++++++++++++++++++++++++++++++++++++++"
HelpMenu$(5,2)="+++++++++++++++++++++++++++++++++++++++++++++++"
HelpMenu$(6,2)="+++++++++++++++++++++++++++++++++++++++++++++++"
HelpMenu$(7,2)="+++++++++++++++++++++++++++++++++++++++++++++++"
HelpMenu$(8,2)="+++++++++++++++++++++++++++++++++++++++++++++++"
HelpMenu$(9,2)="+++++++++++++++++++++++++++++++++++++++++++++++"
HelpMenu$(10,2)="+++++++++++++++++++++++++++++++++++++++++++++++"
HelpMenu$(11,2)="+++++++++++++++++++++++++++++++++++++++++++++++"
HelpMenu$(12,2)="+++++++++++++++++++++++++++++++++++++++++++++++"
HelpMenu$(13,2)="+++++++++++++++++++++++++++++++++++++++++++++++"
HelpMenu$(14,2)="+++++++++++++++++++++++++++++++++++++++++++++++"

HomeMenu$(1,1)="HOME TEAM              DATE 01-01-1990        "
HomeMenu$(2,1)="No      NAME      Pos No      NAME        Pos "
HomeMenu$(3,1)="                                              "
HomeMenu$(4,1)="                                              "
HomeMenu$(5,1)="                                              "
HomeMenu$(6,1)="                                              "
HomeMenu$(7,1)="                                              "
HomeMenu$(8,1)="                                              "
HomeMenu$(9,1)="                                              "
HomeMenu$(10,1)="                                             "
HomeMenu$(11,1)="                                             "
HomeMenu$(12,1)="                                             "
HomeMenu$(13,1)="                                             "
```

```
HomeMenu$(14,1)="                                                    "
HomeMenu$(1,2)="++++++++++$$$$$$'    '$$$$$$$++++++##+##+####"
HomeMenu$(2,2)="+++++++++++++++    ++++++++++++++++++++++++"
HomeMenu$(3,2)="##+$$$$$$$$$$$$$$    $$###$$$$$$$$$$$$$$$++$$"
HomeMenu$(4,2)="##+$$$$$$$$$$$$$$++$$###+$$$$$$$$$$$$$$$++$$"
HomeMenu$(5,2)="##+$$$$$$$$$$$$$$++$$###+$$$$$$$$$$$$$$$++$$"
HomeMenu$(6,2)="##+$$$$$$$$$$$$$$++$$###+$$$$$$$$$$$$$$$++$$"
HomeMenu$(7,2)="##+$$$$$$$$$$$$$$++$$###+$$$$$$$$$$$$$$$++$$"
HomeMenu$(8,2)="##+$$$$$$$$$$$$$$++$$###+$$$$$$$$$$$$$$$++$$"
HomeMenu$(9,2)="##+$$$$$$$$$$$$$$++$$###+$$$$$$$$$$$$$$$++$$"
HomeMenu$(10,2)="##+$$$$$$$$$$$$$$++$$###+$$$$$$$$$$$$$$$++$$"
HomeMenu$(11,2)="##+$$$$$$$$$$$$$$++$$###+$$$$$$$$$$$$$$$++$$"
HomeMenu$(12,2)="##+$$$$$$$$$$$$$$++$$###+$$$$$$$$$$$$$$$++$$"
HomeMenu$(13,2)="##+$$$$$$$$$$$$$$++$$###+$$$$$$$$$$$$$$$++$$"
HomeMenu$(14,2)="##+$$$$$$$$$$$$$$++$$^##+$$$$$$$$$$$$$$$++$$"

VistMenu$(1,1)="VISTORS                              DATE 01-01-1990"
VistMenu$(2,1)="No      NAME           Pos No      NAME          Pos"
VistMenu$(3,1)="                                                    "
VistMenu$(4,1)="                                                    "
VistMenu$(5,1)="                                                    "
VistMenu$(6,1)="                                                    "
VistMenu$(7,1)="                                                    "
VistMenu$(8,1)="                                                    "
VistMenu$(9,1)="                                                    "
VistMenu$(10,1)="                                                   "
VistMenu$(11,1)="                                                   "
VistMenu$(12,1)="                                                   "
VistMenu$(13,1)="                                                   "
VistMenu$(14,1)="                                                   "

VistMenu$(1,2)="++++++++++$$$$$$$$$$$$$$$$$++++++##+##+####"
VistMenu$(2,2)="+++++++++++++++++++++++++++++++++++++++++++"
VistMenu$(3,2)="##+$$$$$$$$$$$$$$++$$###+$$$$$$$$$$$$$$$++$$"
VistMenu$(4,2)="##+$$$$$$$$$$$$$$++$$###+$$$$$$$$$$$$$$$++$$"
VistMenu$(5,2)="##+$$$$$$$$$$$$$$++$$###+$$$$$$$$$$$$$$$++$$"
VistMenu$(6,2)="##+$$$$$$$$$$$$$$++$$###+$$$$$$$$$$$$$$$++$$"
VistMenu$(7,2)="##+$$$$$$$$$$$$$$++$$###+$$$$$$$$$$$$$$$++$$"
VistMenu$(8,2)="##+$$$$$$$$$$$$$$++$$###+$$$$$$$$$$$$$$$++$$"
VistMenu$(9,2)="##+$$$$$$$$$$$$$$++$$###+$$$$$$$$$$$$$$$++$$"
VistMenu$(10,2)="##+$$$$$$$$$$$$$$++$$###+$$$$$$$$$$$$$$$++$$"
VistMenu$(11,2)="##+$$$$$$$$$$$$$$++$$###+$$$$$$$$$$$$$$$++$$"
VistMenu$(12,2)="##+$$$$$$$$$$$$$$++$$###+$$$$$$$$$$$$$$$++$$"
VistMenu$(13,2)="##+$$$$$$$$$$$$$$++$$###+$$$$$$$$$$$$$$$++$$"
VistMenu$(14,2)="##+$$$$$$$$$$$$$$++$$^##+$$$$$$$$$$$$$$$++$$"

MID$(VistMenu$(1,1),36)=DATE$
MID$(HomeMenu$(1,1),36)=DATE$

OPEN "HOME TEAM" FOR INPUT AS #1
OPEN "VISTING TEAM" FOR INPUT AS #2

Counter%=1
INPUT #1, Team$(1)
MID$(HomeMenu$(1,1),11)=Team$(1)
WHILE NOT EOF(1)
    INPUT #1,PlayerNumber$(Counter%,1)
    INPUT #1,PlayerName$(Counter%,1)
    INPUT #1,PlayerPosition$(Counter%,1)
    MID$(HomeMenu$(Counter%+2,1),1)=PlayerNumber$(Counter%,1)
    MID$(HomeMenu$(Counter%+2,1),4)=PlayerName$(Counter%,1)
    MID$(HomeMenu$(Counter%+2,1),21)=PlayerPosition$(Counter%,1)
    Counter%=Counter%+1
WEND Counter%=1
INPUT #2,Team$(2)
MID$(VistMenu$(1,1),11)=Team$(2)
WHILE NOT EOF(2)
    INPUT #2,PlayerNumber$(Counter%,2)
    INPUT #2,PlayerName$(Counter%,2)
    INPUT #2,PlayerPosition$(Counter%,2)
    MID$(VistMenu$(Counter%+2,1),1)=PlayerNumber$(Counter%,2)
    MID$(VistMenu$(Counter%+2,1),4)=PlayerName$(Counter%,2)
    MID$(VistMenu$(Counter%+2,1),21)=PlayerPosition$(Counter%,2)
    Counter%=Counter%+1
WEND

CLOSE
```

```
Team=2
HomePlayer=0
VistPlayer=0
Inning=.5
Hits=0
Balls=0
Strikes=0
Errors=0
Outs=0
Runs=0
HomeRuns=0
VistRuns=0
Pitches=0
HomePitches=0
VistPitches=0

DIM KeyType$(82)

ON TIMER(1) GOSUB Ticks
ON DIALOG GOSUB ServiceButton : DIALOG ON
TIMER ON
'*****************************
WINDOW 1,"Display",(1,20)-(640,480),3
BackColor(30)
CLS
X%=0 : Y%=0 : CALL SetupScreen (X%,Y%,KeyType$())
Pass%=0
DefaultMenu$="MAIN"

WHILE 1
    SELECT CASE Active$
                CASE "MAIN"
                    CALL DisplayMenu(MainMenu$())
                CASE "HELP"
                    CALL DisplayMenu(HelpMenu$())
                CASE "HOME"
                    CALL DisplayMenu(HomeMenu$())
                CASE "VISTOR"
                    CALL DisplayMenu(VistMenu$())
                CASE ELSE
    END SELECT
WEND ServiceButton:
    IF DIALOG(0)=0 THEN RETURN
    ButtonPushed%=DIALOG(1)
    IF Active$="MAIN" THEN
        l%=LEN(KeyType$(ButtonPushed%))
        MID$(MainMenu$(13,1),34)=" "+KeyType$(ButtonPushed%)+STRING$(9-l%," ")
        BackColor(33)
        ForeColor(30)
        LOCATE 14,35
        DrawText(" "+KeyType$(ButtonPushed%)+STRING$(9-l%," "))
        BackColor(30)
        ForeColor(33)
    END IF
    SELECT CASE KeyType$(ButtonPushed%)
                CASE "OUTS" , "1 B" , "2 B" , "3 B" , "HR" , "HP"
                    Pass%=1
                CASE ELSE
    END SELECT SELECT CASE KeyType$(ButtonPushed%)
                CASE "BALL"
                    CALL Ball
                    Pass%=1
                CASE "FOUL"
                    CALL Foul
                    Pass%=1
                CASE "STRIKE"
                    Pass%=1
                    CALL Strike CASE "HOME"
                    IF Active$<>"HOME" THEN
                        Active$="HOME"
                    ELSE
                        Active$=DefaultMenu$
                    END IF
                CASE "VISTOR"
                    IF Active$<>"VISTOR" THEN
```

```
                            Active$="VISTOR"
                    ELSE
                            e$=DefaultMenu$
                    END
            CASE "HELP"
                    IF Active$<>"HELP" THEN
                            Active$="HELP"
                    ELSE
                            Active$=DefaultMenu$
                    END IF
            CASE "PRINT"
                    GET (0,0)-(638,370),Arry%
                    OPEN "LPT1:PROMPT" FOR OUTPUT AS #5
                    WINDOW OUTPUT #5
                    PUT (0,0)-(638,370),Arry%
                    CLOSE #5
            CASE "ENTER"
                    b$=CHR$(9)
            CASE "SPACE"
                    b$=" "
            CASE "left"
                    b$=CHR$(28)
            CASE "right"
                    b$=CHR$(29)
            CASE "up"
                    b$=CHR$(30)
            CASE "dn"
                    b$=CHR$(31)
            CASE "A" TO "Z"
                    b$=KeyType$(ButtonPushed%)
            CASE "0" TO "9"
                    b$=KeyType$(ButtonPushed%)
            CASE ELSE
    END SELECT
    RETURN Ticks:  IF Pass%=1 THEN MySecond%=MySecond%+1
            IF MySecond% = 60 THEN
                MySecond% = 0
                MyMinute% = MyMinute% + 1
            END IF IF MyMinute% = 60 THEN
                MyMinute% = 0
                MyHour% = MyHour% + 1
            END IF IF MyHour%<10 THEN
                Hour$ = "0"+RIGHT$(STR$(MyHour%),1)
            ELSE
                Hour$ = RIGHT$(STR$(MyHour%),2)
            END IF IF MyMinute%<10 THEN
                Minute$ = "0"+RIGHT$(STR$(MyMinute%),1)
            ELSE
                Minute$ = RIGHT$(STR$(MyMinute%),2)
            END IF IF MySecond%<10 THEN
                Second$ = "0"+RIGHT$(STR$(MySecond%),1)
            ELSE
                Second$ = RIGHT$(STR$(MySecond%),2)
            END IF GameTime$ = Hour$ + ":" + Minute$ + ":" + Second$
        END IF IF Active$="MAIN" THEN
            LOCATE 2,8
            DrawText(TIME$)
            LOCATE 2,37
            DrawText(GameTime$)
        END IF
        MID$(MainMenu$(1,1),7)=TIME$
        MID$(MainMenu$(1,1),36)=GameTime$
        RETURN SUB DisplayMenu (ScrnBuff$()) STATIC
```

```
SHARED OldRow%,OldCol%,Active$,b$

BackColor(30)
    ForeColor(33)
    TEXTSIZE(9)
    TEXTFACE(1)
    TEXTFONT(4)

CursorRow%=1
    CursorCol%=1
    OldCharacter$=""

CALL LCDisplay (ScrnBuff$())
    TEXTFACE(5)

SELECT CASE Active$
            CASE "HOME","VISTOR"
                    CALL TeamGrid
            CASE "MAIN"
                    CALL MainGrid
            CASE "HELP"
                    CALL HelpGrid
            CASE ELSE
    END SELECT OldActive$=Active$
    b$=""
    WHILE Active$=OldActive$
        i$=""
        WHILE i$=""
            i$=INKEY$
            IF b$<>"" THEN i$=LEFT$(b$,1):b$=RIGHT$(b$,LEN(b$)-1)
            IF i$=CHR$(13) THEN i$=CHR$(9)
            IF Active$<>OldActive$ THEN EXIT SUB
        WEND
        TEXTFACE(5)
        SELECT CASE ASC(i$)
                    CASE 8
                        OldCharacter$=" "
                        CALL MoveCursor(28,CursorRow%,CursorCol%,OldCharacter$,ScrnBuff$())
                        BackColor(33)
                        ForeColor(30)
                        DrawText (" ")
                        BackColor(30)
                        ForeColor(33)
                    CASE 9
                        CALL MoveCursor(13,CursorRow%,CursorCol%,OldCharacter$,ScrnBuff$())
                    CASE 28 TO 31
                        CALL MoveCursor(ASC(i$),CursorRow%,CursorCol%,OldCharacter$,ScrnBuff$())
                    CASE ELSE
                        Character$=UCASE$(i$)
                        Format$=MID$(ScrnBuff$(CursorRow%,2),CursorCol%,1)
                        IF Format$="$" THEN
                            IF Character$=>"A" AND Character$=<"Z" OR Character$=>"0" AND Character$=<"9" C
                                OldCharacter$=Character$
                                CALL MoveCursor(29,CursorRow%,CursorCol%,OldCharacter$,ScrnBuff$())
                            END IF
                        ELSEIF Format$="#" THEN
                            IF Character$=>"0" AND Character$=<"9" THEN
                                OldCharacter$=Character$
                                CALL MoveCursor(29,CursorRow%,CursorCol%,OldCharacter$,ScrnBuff$())
                            END IF
                        END IF
        END SELECT
    WEND
    i$=""
END SUB SUB LCDisplay(ScrnBuff$()) STATIC
    FOR i%=1 TO UBOUND(ScrnBuff$)
        LOCATE i%+1,2
        DrawText (ScrnBuff$(i%,1))
    NEXT i%
END SUB SUB MoveCursor(Direction%,CursorRow%,CursorCol%,OldCharacter$,ScrnBuff$()) STATIC
    OldRow%=CursorRow%
    OldCol%=CursorCol%
    Relocate:
    SELECT CASE Direction%
        CASE 13
```

```
            j%=INSTR(CursorCol%,ScrnBuff$(CursorRow%,2),"@")
            i%=INSTR(CursorCol%,ScrnBuff$(CursorRow%,2),"+")
            IF i%>0 THEN
                IF j%>0 AND j%<=      EN
                    Direction%=31
                    GOTO Relocate
                END IF
                CursorCol%=i%
                Direction%=29
                GOTO Relocate
            ELSEIF j%>0 THEN
                Direction%=31
                GOTO Relocate
            ELSE
                Direction%=31
                GOTO Relocate
            END IF
        CASE 28
            CheckLeft:
            IF CursorCol%>1 THEN
                CursorCol%=CursorCol%-1
                Temporary$=MID$(ScrnBuff$(CursorRow%,2),CursorCol%,1)
                IF Temporary$="$" OR Temporary$="#"  THEN
                ELSE
                    GOTO CheckLeft
                END IF
            ELSE
                CursorCol%=OldCol%
            END IF
        CASE 29
            CheckRight:
            IF CursorCol%<LEN(ScrnBuff$(1,1)) THEN
                CursorCol%=CursorCol%+1
                Temporary$=MID$(ScrnBuff$(CursorRow%,2),CursorCol%,1)
                IF Temporary$="$" OR Temporary$="#"  THEN
                ELSEIF Temporary$="@" THEN
                    Direction%=31
                    GOTO Relocate
                ELSEIF Temporary$="^" THEN
                    CursorRow%=3
                    CursorCol%=24
                ELSE
                    GOTO CheckRight
                END IF
            ELSE
                CursorCol%=OldCol%
            END IF
        CASE 30
            CheckUp:
            IF CursorRow%>1 THEN
                CursorRow%=CursorRow%-1
                CursorCol%=1
                FOR i%=1 TO LEN(ScrnBuff$(CursorRow%,2))
                    Temporary$=MID$(ScrnBuff$(CursorRow%,2),i%,1)
                    IF Temporary$="$" OR Temporary$="#" THEN
                        CursorCol%=i%
                        GOTO ChkUpOk
                    END IF
                NEXT i%
                GOTO CheckUp
                ChkUpOk:
            END IF
        CASE 31
            CheckDown:
            IF CursorRow%<UBOUND(ScrnBuff$) THEN
                CursorRow%=CursorRow%+1
                CursorCol%=1
                FOR i%=1 TO LEN(ScrnBuff$(CursorRow%,2))
                    Temporary$=MID$(ScrnBuff$(CursorRow%,2),i%,1)
                    IF Temporary$="$" OR Temporary$="#" THEN
                        CursorCol%=i%
                        GOTO ChkDwnOk
                    END IF
                NEXT i%
                GOTO CheckDown
                ChkDwnOk:
            END IF
        CASE ELSE
            EXIT SUB
    END SELECT
    LOCATE OldRow%+1,OldCol%+1
```

```
        DrawText (OldCharacter$)
        MID$(ScrnBuff$(OldRow%,1),OldCol%)=OldCharacter$
        BackColor(33)
        ForeColor(30)
        LOCATE CursorRow%+1,CursorCol%
        DrawText (MID$(ScrnBuff$(CursorRow%,1),CursorCol%,1))
        LOCATE CursorRow%+1,CursorCol%+1
        BackColor(30)
        ForeColor(33)
        OldCharacter$=MID$(ScrnBuff$(CursorRow%,1),CursorCol%,1)
END SUB SUB MainGrid STATIC
SHARED Team,Team$(),Inning,Balls,Outs,Strikes
SHARED Pitches,VistPitches,HomePitches,LOB
SHARED Runs,RunsThisInning,VistRuns,HomeRuns
SHARED HomePlayer,VistPlayer
SHARED PlayerNumber$(),PlayerName$(),PlayerPosition$()
SHARED FirstBaseNumber$,SecondBaseNumber$,ThirdBaseNumber$
SHARED GameTime$
    MID$(MainMenu$(1,1),7)=TIME$
    MID$(MainMenu$(1,1),36)=GameTime$
        TEXTFACE(5)
        CALL UpDateTeam
        CALL UpDateInning
        CALL UpDatePlayer
        LOCATE 8,8
        DrawText (STRING$(21-POS(0),32))
        LOCATE 8,8
        DrawText (STR$(Hits))
        CALL UpDateBalls
        CALL UpDateRuns
        CALL UpDateStrikes
        LOCATE 12,10
        DrawText (STRING$(21-POS(0),32))
        LOCATE 12,10
        DrawText (STR$(Errors))
        CALL UpDateOuts
        CALL UpDatePitches
        CALL UpDatePrintPlayer
END SUB SUB HelpGrid STATIC
    LINE (121,21)-(198,34),,b
    LINE (160,54)-(160,141)
    FOR i%=5 TO 13
        LOCATE i%,1
        LINE (8,i%*11-1)-(324,i%*11-1)
    NEXT i%
END SUB SUB TeamGrid STATIC
    TEXTFACE(5)
    LINE (78,21)-(207,21)
    LINE (253,21)-(325,21)
    LINE (26,32)-(26,164)
    LINE (142,32)-(142,164)
    LINE (167,32)-(167,164)
    LINE (187,32)-(187,164)
    LINE (303,32)-(303,164)
    FOR i%=3 TO 15
        LOCATE i%,1
        LINE (8,i%*11-1)-(324,i%*11-1)
    NEXT i%
    TEXTFACE(1)
END SUB SUB SetupScreen (X%,Y%,KeyType$()) STATIC
    ForeColor(30)
    LINE (X%,Y%)-(X%+638,Y%+370),,b
    X%=X%+20 : Y%=Y%+180
    OldX%=X% : OldY%=Y%
    CALL KeyBoard (X%,Y%,KeyType$())
    X%=OldX%+238 : Y%=OldY%-170
    CALL BallField (X%,Y%,KeyType$())
    ForeColor(33)
    BackColor(30)
    TEXTFACE(1)
    TEXTSIZE(9)
END SUB
```

```
SUB BallField (X%,Y%,KeyType$()) STATIC
    ForeColor(341)
    R%(0)=Y%
    R%(1)=X%
    R%(2)=R%(0)+390
    R%(3)=R%(1)+390

CALL PAINTARC (VARPTR(R%(0)),-45,90)
    ForeColor(30)
    LINE  (R%(1)+64,R%(0)+58)-(R%(1)+194,R%(0)+188)
    LINE -(R%(1)+324,R%(0)+58)
    LINE  (R%(1)+146,R%(0)+138)-(R%(1)+194,R%(0)+90)
    LINE -(R%(1)+242,R%(0)+138)

BUTTON 1,1,"1",(R%(1)+186,R%(0)+129)-(R%(1)+204,R%(0)+149),1:KeyType$(1)="P "
    BUTTON 2,1,"2",(R%(1)+186,R%(0)+170)-(R%(1)+204,R%(0)+190),1 : KeyType$(2)="C "
    BUTTON 3,1,"3",(R%(1)+230,R%(0)+129)-(R%(1)+248,R%(0)+149),1 : KeyType$(3)="1B"
    BUTTON 4,1,"4",(R%(1)+186,R%(0)+86)-(R%(1)+204,R%(0)+106),1 : KeyType$(4)="2B"
    BUTTON 5,1,"5",(R%(1)+142,R%(0)+129)-(R%(1)+160,R%(0)+149),1 : KeyType$(5)="3B"
    BUTTON 6,1,"6",(R%(1)+148,R%(0)+86)-(R%(1)+166,R%(0)+106),1 : KeyType$(6)="SS"
    BUTTON 7,1,"7",(R%(1)+112,R%(0)+36)-(R%(1)+130,R%(0)+56),1 : KeyType$(7)="LF"
    BUTTON 8,1,"8",(R%(1)+186,R%(0)+16)-(R%(1)+204,R%(0)+36),1 : KeyType$(8)="CF"
    BUTTON 9,1,"9",(R%(1)+260,R%(0)+36)-(R%(1)+278,R%(0)+56),1 : KeyType$(9)="RF"
END SUB SUB KeyBoard (X%,Y%,KeyType$()) STATIC
    OldY%=Y% : OldX%=X%
    VetGap%=40
    WideKey%=44 : NarrowKey%=24

BUTTON 16,1,"*",(X%,Y%)-(X%+NarrowKey%,Y%+20),1 : KeyType$(16)="*"
    Y%=Y%+VetGap%
    BUTTON 17,1,"+",(X%,Y%)-(X%+NarrowKey%,Y%+20),1 : KeyType$(17)="+"
    Y%=Y%+VetGap%
    BUTTON 18,1,"-",(X%,Y%)-(X%+NarrowKey%,Y%+20),1 : KeyType$(18)="-"
    Y%=Y%+VetGap%
    BUTTON 19,1,"x",(X%,Y%)-(X%+NarrowKey%,Y%+20),1 : KeyType$(19)="x"
    Y%=Y%+VetGap%
    BUTTON 20,1,"/",(X%,Y%)-(X%+NarrowKey%,Y%+20),1 : KeyType$(20)="/"

X%=X%+(WideKey%/2)+NarrowKey% : Y%=OldY%
    BUTTON 21,1,"CALC",(X%,Y%)-(X%+WideKey%,Y%+20),1 : KeyType$(21)="CALC"
    Y%=Y%+VetGap%
    BUTTON 22,1,"PRINT",(X%,Y%)-(X%+WideKey%,Y%+20),1 : KeyType$(22)="PRINT"
    Y%=Y%+VetGap%
    BUTTON 23,1,"1",(X%,Y%)-(X%+NarrowKey%,Y%+20),1 : KeyType$(23)="1"
    Y%=Y%+VetGap%
    BUTTON 24,1,"A",(X%,Y%)-(X%+NarrowKey%,Y%+20),1 : KeyType$(24)="A"
    Y%=Y%+VetGap%
    BUTTON 25,1,"N",(X%,Y%)-(X%+NarrowKey%,Y%+20),1 : KeyType$(25)="N"

X%=X%+(WideKey%/2)+NarrowKey% : Y%=OldY%+(2*VetGap%)
    BUTTON 26,1,"2",(X%,Y%)-(X%+NarrowKey%,Y%+20),1 : KeyType$(26)="2"
    Y%=Y%+VetGap%
    BUTTON 27,1,"B",(X%,Y%)-(X%+NarrowKey%,Y%+20),1 : KeyType$(27)="B"
    Y%=Y%+VetGap%
    BUTTON 28,1,"O",(X%,Y%)-(X%+NarrowKey%,Y%+20),1 : KeyType$(28)="O"

X%=X%+(WideKey%/2) : Y%=OldY%
    BUTTON 29,1,"HOME",(X%,Y%)-(X%+WideKey%,Y%+20),1 : KeyType$(29)="HOME"
    Y%=Y%+VetGap%
    BUTTON 30,1,"VISIT",(X%,Y%)-(X%+WideKey%,Y%+20),1 : KeyType$(30)="VISTOR"

X%=X%+(WideKey%/2) : Y%=OldY%+(2*VetGap%)
    BUTTON 31,1,"3",(X%,Y%)-(X%+NarrowKey%,Y%+20),1 : KeyType$(31)="3"
    Y%=Y%+VetGap%
    BUTTON 32,1,"C",(X%,Y%)-(X%+NarrowKey%,Y%+20),1 : KeyType$(32)="C"
    Y%=Y%+VetGap%
    BUTTON 33,1,"P",(X%,Y%)-(X%+NarrowKey%,Y%+20),1 : KeyType$(33)="P"

X%=X%+(WideKey%/2)+NarrowKey% : Y%=OldY%
    BUTTON 34,1,"SPACE",(X%,Y%)-(X%+WideKey%,Y%+20),1 : KeyType$(34)="SPACE"
    Y%=Y%+VetGap%
    BUTTON 35,1,"HELP",(X%,Y%)-(X%+WideKey%,Y%+20),1 : KeyType$(35)="HELP"
    Y%=Y%+VetGap%
    BUTTON 36,1,"4",(X%,Y%)-(X%+NarrowKey%,Y%+20),1 : KeyType$(36)="4"
    Y%=Y%+VetGap%
    BUTTON 37,1,"D",(X%,Y%)-(X%+NarrowKey%,Y%+20),1 : KeyType$(37)="D"
    Y%=Y%+VetGap%
    BUTTON 38,1,"Q",(X%,Y%)-(X%+NarrowKey%,Y%+20),1 : KeyType$(38)="Q"
```

```
X%=X%+(WideKey%/2)+NarrowKey% : Y%=OldY%+(2*VetGap%)
BUTTON 39,1,"5",(X%,Y%)-(X%+NarrowKey%,Y%+20),1 : KeyType$(39)="5"
Y%=Y%+VetGap%
BUTTON 40,1,"E",(X%,Y%)-(X%+NarrowKey%,Y%+20),1 : KeyType$(40)="E"
Y%=Y%+VetGap%
BUTTON 41,1,"R",(X%,Y%)-(X%+NarrowKey%,Y%+20),1 : KeyType$(41)="R"

X%=X%+(WideKey%/2) : Y%=OldY%
BUTTON 42,1,"ENTER",(X%,Y%)-(X%+WideKey%,Y%+20),1 : KeyType$(42)="ENTER"
Y%=Y%+VetGap%
BUTTON 43,1,"up",(X%,Y%)-(X%+NarrowKey%,Y%+20),1 : KeyType$(43)="up"
X%=X%+(NarrowKey%)
BUTTON 44,1,"dn",(X%,Y%)-(X%+NarrowKey%,Y%+20),1 : KeyType$(44)="dn"

Y%=OldY%+(2*VetGap%)
BUTTON 45,1,"6",(X%,Y%)-(X%+NarrowKey%,Y%+20),1 : KeyType$(45)="6"
Y%=Y%+VetGap%
BUTTON 46,1,"F",(X%,Y%)-(X%+NarrowKey%,Y%+20),1 : KeyType$(46)="F"
Y%=Y%+VetGap%
BUTTON 47,1,"S",(X%,Y%)-(X%+NarrowKey%,Y%+20),1 : KeyType$(47)="S"

X%=X%+(WideKey%/2)+NarrowKey% : Y%=OldY%-VetGap%
BUTTON 10,1,"FOUL",(X%,Y%)-(X%+WideKey%,Y%+20),1 : KeyType$(10)="FOUL"
Y%=Y%+VetGap%
BUTTON 48,1,"SUB",(X%,Y%)-(X%+WideKey%,Y%+20),1 : KeyType$(48)="SUB"
Y%=Y%+VetGap%
BUTTON 49,1,"<",(X%,Y%)-(X%+NarrowKey%,Y%+20),1 : KeyType$(49)="left"
OldX%=X% : X%=X%+(NarrowKey%)
BUTTON 50,1,">",(X%,Y%)-(X%+NarrowKey%,Y%+20),1 : KeyType$(50)="right"
X%=OldX% : Y%=Y%+VetGap%
BUTTON 51,1,"7",(X%,Y%)-(X%+NarrowKey%,Y%+20),1 : KeyType$(51)="7"
Y%=Y%+VetGap%
BUTTON 53,1,"G",(X%,Y%)-(X%+NarrowKey%,Y%+20),1 : KeyType$(53)="G"
Y%=Y%+VetGap%
BUTTON 54,1,"T",(X%,Y%)-(X%+NarrowKey%,Y%+20),1 : KeyType$(54)="T"

X%=X%+(WideKey%/2)+NarrowKey% : Y%=OldY%+(2*VetGap%)
BUTTON 55,1,"8",(X%,Y%)-(X%+NarrowKey%,Y%+20),1 : KeyType$(55)="8"
Y%=Y%+VetGap%
BUTTON 56,1,"H",(X%,Y%)-(X%+NarrowKey%,Y%+20),1 : KeyType$(56)="H"
Y%=Y%+VetGap%
BUTTON 57,1,"U",(X%,Y%)-(X%+NarrowKey%,Y%+20),1 : KeyType$(57)="U"

X%=X%+(WideKey%/2) : Y%=OldY%+VetGap%
BUTTON 58,1,"Special",(X%,Y%)-(X%+WideKey%,Y%+20),1 : KeyType$(58)="SPECIAL"

X%=X%+(WideKey%/2): Y%=OldY%+(2*VetGap%)
BUTTON 59,1,"9",(X%,Y%)-(X%+NarrowKey%,Y%+20),1 : KeyType$(59)="9"
Y%=Y%+VetGap%
BUTTON 60,1,"I",(X%,Y%)-(X%+NarrowKey%,Y%+20),1 : KeyType$(60)="I"
Y%=Y%+VetGap%
BUTTON 61,1,"V",(X%,Y%)-(X%+NarrowKey%,Y%+20),1 : KeyType$(61)="V"

X%=X%+(WideKey%/2)+NarrowKey%  : Y%=OldY%+VetGap%
BUTTON 62,1,"DH",(X%,Y%)-(X%+NarrowKey%,Y%+20),1 : KeyType$(62)="DH"
Y%=Y%+VetGap%
BUTTON 63,1,"O",(X%,Y%)-(X%+NarrowKey%,Y%+20),1 : KeyType$(63)="O"
Y%=Y%+VetGap%
BUTTON 64,1,"J",(X%,Y%)-(X%+NarrowKey%,Y%+20),1 : KeyType$(64)="J"
Y%=Y%+VetGap%
BUTTON 65,1,"W",(X%,Y%)-(X%+NarrowKey%,Y%+20),1 : KeyType$(65)="W"

X%=X%+(WideKey%/2)+NarrowKey% : Y%=OldY%-VetGap%
BUTTON 66,1,"BALL",(X%,Y%)-(X%+WideKey%,Y%+20),1 : KeyType$(66)="BALL"
Y%=Y%+VetGap%
BUTTON 67,1,"STRIKE",(X%,Y%)-(X%+WideKey%,Y%+20),1 : KeyType$(67)="STRIKE"
Y%=Y%+VetGap%
BUTTON 68,1,"OUTS",(X%,Y%)-(X%+WideKey%,Y%+20),1 : KeyType$(68)="OUTS"
Y%=Y%+VetGap%
BUTTON 69,1,"ERROR",(X%,Y%)-(X%+WideKey%,Y%+20),1 : KeyType$(69)="ERROR"
Y%=Y%+VetGap%
BUTTON 70,1,"K",(X%,Y%)-(X%+NarrowKey%,Y%+20),1 : KeyType$(70)="K"
Y%=Y%+VetGap%
BUTTON 71,1,"X",(X%,Y%)-(X%+NarrowKey%,Y%+20),1 : KeyType$(71)="X"

X%=X%+(WideKey%/2)+NarrowKey% : Y%=OldY%+(3*VetGap%)
BUTTON 72,1,"L",(X%,Y%)-(X%+NarrowKey%,Y%+20),1 : KeyType$(72)="L"
Y%=Y%+VetGap%
BUTTON 73,1,"Y",(X%,Y%)-(X%+NarrowKey%,Y%+20),1 : KeyType$(73)="Y"

X%=X%+(WideKey%/2) : Y%=OldY%-(4 * VetGap%)
```

```
        BUTTON 74,1,"1 B",(X%,Y%)-(X%+WideKey%,Y%+20),1 : KeyType$(74)="1 B"
        Y%=Y%+VetGap%
        BUTTON 75,1,"2 B",(X%,Y%)-(X%    'eKey%,Y%+20),1 : KeyType$(75)="2 B"
        Y%=Y%+VetGap%
        BUTTON 76,1,"3 B",(X%,Y%)-(X%    eKey%,Y%+20),1 : KeyType$(76)="3 B"
        Y%=Y%+VetGap%
        BUTTON 77,1,"HR",(X%,Y%)-(X%+WideKey%,Y%+20),1 : KeyType$(77)="HR"
        Y%=Y%+VetGap%
        BUTTON 78,1,"B B",(X%,Y%)-(X%+WideKey%,Y%+20),1 : KeyType$(78)="B B"
        Y%=Y%+VetGap%
        BUTTON 79,1,"SAC",(X%,Y%)-(X%+WideKey%,Y%+20),1 : KeyType$(79)="SAC"
        Y%=Y%+VetGap%
        BUTTON 80,1,"HP",(X%,Y%)-(X%+WideKey%,Y%+20),1 : KeyType$(80)="HP"
        X%=X%+(WideKey%/2) : Y%=Y%+VetGap%
        BUTTON 81,1,"M",(X%,Y%)-(X%+NarrowKey%,Y%+20),1 : KeyType$(81)="M"
        Y%=Y%+VetGap%
        BUTTON 82,1,"Z",(X%,Y%)-(X%+NarrowKey%,Y%+20),1 : KeyType$(82)="Z"
END SUB SUB PrintScreen (Arry%()) STATIC
    RETURN
END SUB SUB UpDateFirstBase STATIC
SHARED Team,Player,HomePlayer,VistPlayer
SHARED PlayerNumber$(),PlayerName$(),PlayerPosition$()
SHARED FirstBaseNumber$
SHARED FirstBaseName$
SHARED FirstBasePosition$
    IF FirstBaseNumber$<>"" THEN
        CALL UpDateSecondBase
    END IF
        FirstBaseNumber$=PlayerNumber$(Player,Team)
        FirstBaseName$=PlayerName$(Player,Team)
        FirstBasePosition$=PlayerPosition$(Player,Team)
END SUB SUB UpDateSecondBase STATIC
SHARED FirstBaseNumber$
SHARED FirstBaseName$
SHARED FirstBasePosition$
SHARED SecondBaseNumber$
SHARED SecondBaseName$
SHARED SecondBasePosition$
    IF SecondBaseNumber$<>"" THEN
        CALL UpDateThirdBase
    END IF
        SecondBaseNumber$=FirstBaseNumber$
        SecondBaseName$=FirstBaseName$
        SecondBasePosition$=FirstBasePosition$
END SUB SUB UpDateThirdBase STATIC
SHARED SecondBaseNumber$
SHARED SecondBaseName$
SHARED SecondBasePosition$
SHARED ThirdBaseNumber$
SHARED ThirdBaseName$
SHARED ThirdBasePosition$
    IF ThirdBaseNumber$<>"" THEN
        CALL UpDateHomeBase
    END IF
        ThirdBaseNumber$=SecondBaseNumber$
        ThirdBaseName$=SecondBaseName$
        ThirdBasePosition$=SecondBasePosition$
END SUB SUB UpDateHomeBase STATIC
SHARED ThirdBaseNumber$
SHARED ThirdBaseName$
SHARED ThirdBasePosition$
SHARED Runs, RunsThisInning
    Runs=Runs+1
    RunsThisInning=RunsThisInning+1
    CALL UpDateRuns
END SUB SUB Ball STATIC
SHARED Pitches,Balls
SHARED Team,Player,HomePlayer,VistPlayer
```

```
SHARED PlayerNumber$(),PlayerName$(),PlayerPosition$()
SHARED LastBuffer$
    Pitches=Pitches+1
    CALL UpDatePitches
    Balls=Balls+1
    IF Balls=4 THEN
        Balls=0
        LastBuffer$=LastBuffer$+" BB"
        CALL UpDateFirstBase
        CALL UpDatePlayer
    END IF
    CALL UpDateBalls
END SUB SUB Foul STATIC
SHARED Pitches,Strikes
    Pitches=Pitches+1
    CALL UpDatePitches
    IF Strikes<2 THEN
        Strikes=Strikes+1
        CALL UpDateStrikes
    END IF
END SUB SUB Strike STATIC
SHARED Team,Team$(),Inning,Balls,Outs,Strikes
SHARED Pitches,VistPitches,HomePitches,LOB
SHARED Runs,RunsThisInning,VistRuns,HomeRuns
SHARED HomePlayer,VistPlayer
SHARED PlayerNumber$(),PlayerName$(),PlayerPosition$()
SHARED FirstBaseNumber$,SecondBaseNumber$,ThirdBaseNumber$
    Pitches=Pitches+1
    CALL UpDatePitches
    Strikes=Strikes+1
    IF Strikes=3 THEN
        Outs=Outs+1
        IF Outs=3 THEN
            Outs=0
            LOB=0
            IF FirstBaseNumber$<>"" THEN LOB=LOB+1
            IF SecondBaseNumber$<>"" THEN LOB=LOB+1
            IF ThirdBaseNumber$<>"" THEN LOB=LOB+1
            FirstBaseNumber$=""
            SecondBaseNumber$=""
            ThirdBaseNumber$=""
            IF Team=1 THEN
                Team=2
                VistPitches=Pitches
                HomeRuns=Runs
                CALL UpDatePrintOut
                Pitches=HomePitches
                Runs=VistRuns
            ELSE
                Team=1
                HomePitches=Pitches
                VistRuns=Runs
                CALL UpDatePrintRuns
                Pitches=VistPitches
                Runs=HomeRuns
            END IF
            RunsThisInning=0
            CALL UpDatePitches
            CALL UpDateRuns
            CALL UpDateTeam
            Inning=Inning+.5
            CALL UpDateInning
        END IF
        CALL UpDateOuts
        Balls=0
        CALL UpDateBalls
        Strikes=0
        CALL UpDateStrikes
        CALL UpDatePlayer
    END IF
    CALL UpDateStrikes
END SUB SUB UpDatePrintRuns STATIC
SHARED Inning,RunsThisInning,Hits,Errors,LOB
SHARED HomeRuns, VistRuns
    LOCATE 22,1
```

```
    TEXTFACE(1)
    PRINT USING "##.#";Inning;
    PRINT " ";
    PRINT USING "##";RunsThisIn;
    PRINT "R ";
    PRINT USING "##";Hits;
    PRINT "H ";
    PRINT USING "##";Errors;
    PRINT "E ";
    PRINT USING "#";LOB;
    PRINT "LO"

PRINT "HOME ";
    PRINT USING "###";HomeRuns;
    PRINT "   VISITOR ";
    PRINT USING "###";VistRuns
    TEXTFACE(5)
END SUB SUB UpDatePrintPlayer STATIC
SHARED Team,HomePlayer,VistPlayer
SHARED PlayerNumber$(),PlayerName$(),PlayerPosition$()
SHARED LastBuffer$
    LOCATE 40,1
    SELECT CASE Team
            CASE 1
                    PRINT PlayerNumber$(HomePlayer,Team);" ";
                    PRINT PlayerName$(HomePlayer,Team);" ";
                    PRINT PlayerPosition$(HomePlayer,Team)
            CASE 2
                    PRINT PlayerNumber$(VistPlayer,Team);" ";
                    PRINT PlayerName$(VistPlayer,Team);" ";
                    PRINT PlayerPosition$(VistPlayer,Team)
            CASE ELSE
    END SELECT
    LOCATE 41,1
    PRINT LastBuffer$
    LastBuffer$=""
END SUB SUB UpDateRuns STATIC
SHARED Runs
    LOCATE 10,8
    DrawText (STRING$(21-POS(0),32))
    LOCATE 10,8
    DrawText (STR$(Runs))
END SUB SUB UpDateBalls STATIC
SHARED Balls
    LOCATE 8,30
    DrawText (STRING$(44-POS(0),32))
    LOCATE 8,30
    DrawText (STR$(Balls))
END SUB SUB UpDateStrikes STATIC
SHARED Strikes
    LOCATE 10,32
    DrawText (STRING$(44-POS(0),32))
    LOCATE 10,32
    DrawText (STR$(Strikes))
END SUB SUB UpDatePitches STATIC
SHARED Pitches
    LOCATE 14,17
    DrawText (STRING$(21-POS(0),32))
    LOCATE 14,17
    DrawText (STR$(Pitches))
END SUB SUB UpDateOuts STATIC
SHARED Outs
    LOCATE 12,29
    DrawText (STRING$(44-POS(0),32))
    LOCATE 12,29
    DrawText (STR$(Outs))
END SUB SUB UpDateInning STATIC
```

```
    SHARED Inning
        LOCATE 4,41
        DrawText ("      ")
        LOCATE 4,41
        DrawText (STR$(Inning))
END SUB SUB UpDatePlayer STATIC
SHARED Team,Player,HomePlayer,VistPlayer
SHARED PlayerNumber$(),PlayerName$(),PlayerPosition$()
    SELECT CASE Team
        CASE 1
            HomePlayer=HomePlayer+1
            IF PlayerName$(HomePlayer,Team)="" THEN
                Player=1
                HomePlayer=1
            ELSE
                Player=HomePlayer
            END IF
        CASE 2
            VistPlayer=VistPlayer+1
            IF PlayerName$(VistPlayer,Team)="" THEN
                Player=1
                VistPlayer=1
            ELSE
                Player=VistPlayer
            END IF
    END SELECT
    LOCATE 6,10
    DrawText ( STRING$(44-POS(0),32) )
    LOCATE 6,10
    DrawText ( PlayerNumber$(Player,Team)+" "+PlayerName$(Player,Team)+" "+PlayerPosition$(Player,Team) )
    CALL UpDatePrintPlayer
END SUB SUB UpDateTeam STATIC
SHARED Team$(),Team
    LOCATE 4,8
    DrawText (STRING$(33-POS(0),32))
    LOCATE 4,8
    DrawText (Team$(Team))
END SUB
```

```
EndMenu$(1,1)="                                                    "
EndMenu$(2,1)="                  FINAL STATS                       "
EndMenu$(3,1)="                                                    "
EndMenu$(4,1)="                                                    "
EndMenu$(5,1)=" FINAL SCORE AFTER ____ INNINGS                     "
EndMenu$(6,1)="                                                    "
EndMenu$(7,1)=" OFFICAL TIME ____   DATE ____                      "
EndMenu$(8,1)="                                                    "
EndMenu$(9,1)=" VISITORS: RUNS ____   HITS ____   ERRORS ____      "
EndMenu$(10,1)="                                                   "
EndMenu$(11,1)=" HOME: RUNS ____   HITS ____   ERRORS ____         "
EndMenu$(12,1)="                                                   "
EndMenu$(13,1)="                                                   "
EndMenu$(14,1)="                                                   "

EndMenu$(1,2)="++++++++++++++++++++++++++++++++++++++++++++++++++"
EndMenu$(2,2)="++++++++++++++++++++++++++++++++++++++++++++++++++"
EndMenu$(3,2)="++++++++++++++++++++++++++++++++++++++++++++++++++"
EndMenu$(4,2)="++++++++++++++++++++++++++++++++++++++++++++++++++"
EndMenu$(5,2)="++++++++++++++++++++++++++++++++++++++++++++++++++"
EndMenu$(6,2)="++++++++++++++++++++++++++++++++++++++++++++++++++"
EndMenu$(7,2)="++++++++++++++++++++++++++++++++++++++++++++++++++"
EndMenu$(8,2)="++++++++++++++++++++++++++++++++++++++++++++++++++"
EndMenu$(9,2)="++++++++++++++++++++++++++++++++++++++++++++++++++"
EndMenu$(10,2)="++++++++++++++++++++++++++++++++++++++++++++++++++"
EndMenu$(11,2)="++++++++++++++++++++++++++++++++++++++++++++++++++"
EndMenu$(12,2)="++++++++++++++++++++++++++++++++++++++++++++++++++"
EndMenu$(13,2)="++++++++++++++++++++++++++++++++++++++++++++++++++"
EndMenu$(14,2)="++++++++++++++++++++++++++++++++++++++++++++++++++"
```

I claim:

1. An electronic baseball scorekeeper, for keeping the score of a real baseball game played by real players on a field, comprising:

a plurality of field position manually operable elements each of which elements is dedicated to a given field position, a plurality of event manually operable elements each of which elements is dedicated to a single type of game event;

a plurality of manually operable alphabet elements for entry of a list of player names by operating different ones of said alphabet elements for the different letters of the alphabet, respectively, that are entered;

storage means for storing said list of player names, events and statistics;

display means for display of events, said list of player names and statistics, processor means, including said storage means, and having a first mode for accepting said list of player names from said alphabet elements, a second mode for providing said list to said display, a third mode for entering data from said field position elements and said event elements into said processor means, a fourth mode for calculating statistics including the score and a fifth mode for providing statistical information to said display, said processor means advancing from player to player on said list as necessary to cause at least a part of said event data and at least a part of said field position data to be provided to said processor means as related to the proper player on said list.

2. The scorekeeper of claim 1, wherein said processor means includes means, which during said third mode, enters into said processor means data, resulting from manual operation of said alphabet elements during said third mode, as event data, said processor means and said display means cooperating to display the information entered into said processor means by the event elements, the player position elements and the alphabet elements, during said third mode, along with the name of a player.

3. The scorekeeper of claim 2, wherein at least some of said players come up to bat, said processor means including means for associating the name of a player who was at bat with the event data that was entered by said alphabet elements, said event elements and said player position elements, during the player's time at bat.

4. The scorekeeper of claim 3, said processor means further including:

means for maintaining current game, team and player status;

means for counting the number of occurrences of at least one of said events;

means for comparing said number to a predetermined count; and means for updating said game, team and player status dependant upon said comparison.

5. The scorekeeper of claim 4, wherein:

said means for counting includes means for tracking the ball/strike count of a current batter;

said means for comparing including means for determining if said batter strikes out or walks; and said means for updating including means for advancing the player rotation and team rotation upon accumulation of sufficient balls, strikes or outs.

6. The scorekeeper of claim 3, said processor further including:

means for maintaining current game, team and player status;

means for recognizing specific game events; and means for updating said game, team player status dependant upon said recognition.

7. The scorekeeper of claim 6, wherein:

said events include hits; and said means for updating includes means for advancing the player rotation after a hit.

8. An electronic baseball scorekeeper as defined in claim 1 including, first and second control elements for the two teams respectively, a display, said processor means including means which during the progress of the game will display information on said display about one team when said first control element is operated and will display information on said display about the other team when said second control element is operated.

9. A device according to claim 1, in which said event manually operable elements include two manually operable elements for entering balls and strikes respectively, and said manually operable elements that are dedicated to player position comprising manually operable elements representing the positions of infielders and outfielders.

10. A device as defined by claim 1, comprising:

said device having a face that has a simulated baseball field on said face, said elements that are dedicated to player positions being positioned on said field.

11. An electronic baseball scorekeeper for keeping statistical information on a real baseball game that progresses through plural half innings and that has real players of two real teams playing on a real baseball field with at least some of the players coming up to bat and while at bat one or more events happen, comprising:

processor means including memory means, said scorekeeper having a player entry mode during which the players names may be entered into said processor means, a game mode for entering into said processor means event data representing said events that occur while batters are at bat and a substitute player entry mode, user operable means for entering the names of the players of the two teams into said processor means when said scorekeeper is in said player entry mode comprising a first set of manually operable elements for respectively entering the separate letters of the names of the players into said processor means, said user operable means including means for entering event data into said processor means when the scorekeeper is in said game mode comprising a second set of manually operable elements; said first and second sets of manually operable elements, when the scorekeeper is in the game mode, comprising said means for entering event data into said processor means, said user operable means including program means (a) for switching the scorekeeper from the player entry mode to the game mode (b) for entering, into said processor means, event data that occurs while any given player is at bat, and (c) for suspending the game mode and switching to the substitute player entry mode for the entry into said processor means the name of a substitute player, said processor means including means (a) for associating event data entered in said processor means with the name of the player who was at bat at the time that the event occurred, and (b) for providing statistics including the score of the game based on the event data entered during the game mode, and means for giving a visual indication of data in said processor means.

12. A device as defined in claim 11, in which said user operable means comprises means (1) for entering the identification of a first fielder who threw the ball to a second fielder to make an out, along with the identification of said second fielder, and (2) for also entering runs, hits, errors and outs.

13. An electronic baseball scorekeeper as defined in claim 11, in which said program means switches the scorekeeper from the player entry mode to the game mode when the first event of the game is entered into said processor means.

14. An electronic baseball scorekeeper as defined in claim 13, in which said user operable means comprises key means and said second set of manually operable elements is a set of event keys, said processor means comprising means which in response to user selection of an event key processes data subsequently entered on said key means as event data.

15. A device for statistical record keeping of a sporting athletic contest involving real baseball players that come up to bat and move on a field of play according to the rules of baseball, there being a plurality of player positions on said field, there being various types of events that may occur while any given player is at bat, the device comprising:

data processing means including a central processing means and an associated memory, user entry means for entering a list of the names of said players into said data processing means and including (a) first manually operable elements for entering into said data processing means, data representing an identification of at least some of the events that occur while any given player is at bat, and (b) second manually operable elements, each element of which is dedicated to one of said player positions and is connected to said data processing means for the entry of data;

said user entry means and said data processing means associating, in said memory, the name of the given player with the data entered by both of said first and second manually operable elements with respect to the events that occurred while such given player was at bat, and display means connected to said data processing means for selective display of data in said data processing means.

16. A device as defined in claim 15, in which said device has a player entry mode in which the names of the players may be entered into said data processing means and a game mode during which the data relating to events may be entered into said data processing means, said first manually operable elements comprising means for entering the names of the players during the player entry mode and for entering data relating to said events during the game mode.

17. A device as defined in claim 15, in which there are manually operable elements each of which is dedicated to a single type of game event.

18. A device as defined in claim 15, in which said device has a player entry mode in which the names of the players may be entered in the data processing means and a game mode during which said data relating to events may be entered into said data processing means, said first manually operable elements comprising two groups of manually operable elements, the first of which groups comprising means for entering player names in said data processing means during the player entry mode and entering event data during the game mode, and the second group comprising elements each of which is dedicated to a single type of game event.

* * * * *